United States Patent [19]

Miraglia

[11] Patent Number: 4,764,119
[45] Date of Patent: Aug. 16, 1988

[54] LEARNING DEVICE AND METHOD OF USING SAME

[76] Inventor: Lucinda J. Miraglia, 4901 E. Tomahawk Trail, Paradise Valley, Ariz. 85253

[21] Appl. No.: 45,575
[22] Filed: May 4, 1987
[51] Int. Cl.$^4$ ............................................. G09B 19/00
[52] U.S. Cl. ................................. 434/260; 24/143 R
[58] Field of Search ................ 434/260, 113, 178, 259

[56] References Cited

U.S. PATENT DOCUMENTS

| | | | |
|---|---|---|---|
| 2,313,874 | 3/1943 | Hume | 434/260 |
| 2,646,630 | 7/1953 | Miller | 434/260 |
| 2,991,561 | 7/1961 | Moore et al. | 434/259 |
| 3,571,951 | 3/1971 | Siegel | 434/178 |
| 4,017,984 | 4/1977 | Bonfigli | 434/260 |

FOREIGN PATENT DOCUMENTS 2011145  7/1979  United Kingdom ................ 434/113

*Primary Examiner*—William H. Grieb
*Attorney, Agent, or Firm*—Richard R. Mybeck

[57] ABSTRACT

A teaching device for pre-school aged children and method of using the same whereby each such child is provided with and thereafter repetitiously drilled with the hand-eye mechanics for tying a bow knot in a string or lace. Each device comprises an elongated body portion having first and second end portions which are readily distinguished from each other by color or feel and an intermediate portion interconnecting the end portion.

3 Claims, 1 Drawing Sheet

LEARNING DEVICE AND METHOD OF USING SAME

INTRODUCTION

The present invention relates to a teaching device and more particularly to a device for teaching pre-school and kindergarten aged children how to tie bows.

BACKGROUND OF INVENTION

One of the most difficult tasks for children ages 3–8 to learn and one which involves considerable hand and eye coorindation is the tying of the bow knot in a shoe lace, dress-belt or like stringed article which is employed in both play and dress.

Indeed, right next to potty training, the ability to tie one's laced shoes is almost essential for the young child to master before being sent off to school to be on one's own. Obviously, a teacher having 20–30 energetic little people has neither the time nor the patience to personally tie shoes for each youngster who might need such help before commencing his/her homeward trek at the end of a school day.

BRIEF SUMMARY OF THE INVENTION

The present invention relates to a teaching device and method of using same which is especially suited to teach pre-school and kindergarten aged children how to tie bows. More particularly, the present invention relates to a teaching device comprising an elongated body portion having first and second end segments which can be readily distinguished from each other by sight or feel and an intermediate portion interconnecting said distinct end portions. Moreover the present invention provides a readily understood method of employing the sensory disfunction between said distinct end portions with a sequence of manual manipulation, which allows the child to successfully tie a bow knot.

There is no prior art device known which accomplishes the result here sought with the means and methods herein disclosed.

Accordingly, a principal object of the present invention is to provide novel and unique means from which children of pre-school or kindergarten age can readily grasp the mechanics of tying a bow knot as required for the laces of shoes or the like.

A still further object of the present invention is to provide a unique and novel lace having distinctive end portions which are readily sighted or sensed and which allow a pre-school or kindergarten age youngster to readily follow simple instructions and accomplish the task of tying a bow knot.

Still a further object of the present invention is to provide teaching means and methods which are readily understood and followed by pre-school or kindergarten aged children including visually handicapped youngsters which not only allow the difficult task to be readily learned and thereafter performed, also provide an enhanced feeling of self accomplishment which is so essential to the healthy development of little people.

These and still further objects as shall hereinafter appear are readily fulfilled by the present invention in a remarkably unexpected manner as will be readily discerned from the following detailed description of an exemplary embodiment thereof, especially when read in conjunction with the accompanying drawing in which like parts bear like numerals through the several views.

DESCRIPTION OF PREFERRED EMBODIMENTS

Figure 1:
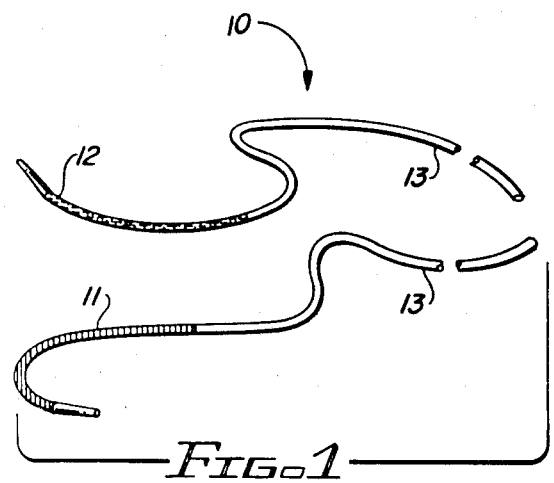
FIG. 1 is an isometric view, partially fragmented, of a teaching device embodying the present invention.

In one practice of the present invention as shown in the drawings, an elongated string or belt-like member, herein called "a lace" 10 is provided with a first end segment 11 of approximately 4–6 inches in length, a second end segment 12 of substantially the same length as segment 11, and an intermediate or center segment 13 interposed between and integrally formed with end segments 11, 12 and having whatever dimension is convenient or the exigencies require as shown in FIG. 1.

Critical to the present invention is the provision of a ready contrast between segment 11 and segment 12 for purposes which shall hereafter appear. This contrast is readily obtained by the use of contrasting bright colors or patterns for children with normal or correctable sight; and with fabrics of different feel (e.g. smooth vs. rough) for the visually impaired. For purposes of illustration, segment 11 will be considered to be bright red and segment 12 bright yellow although, as described, any combination of contrasting colors or designs or fabric textures will be equally suitable to the ultimate purpose hereof.

In practice, the lace 10 can be strung into a child's shoe or into a mock shoe upon which the child can practice in such a way that segments 11 and 12 are substantially totally free and available for creating the bow knot in accordance herewith. If desired, the device 10 can also be used for training apart from any special setting as when the lace 10 itself is gripped by its end segments 11, 12 and segment 13 is allowed to drape between the child's hands. Either way, the child grips each end segment 11, 12 and creates the desired knot by reacting to the following typical instructions.

Figure 2:
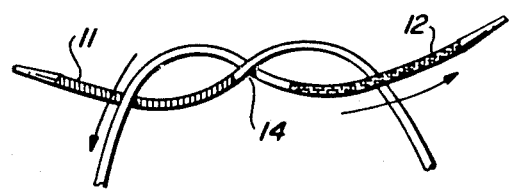
FIG. 2 is an isometric view, partially fragmented, of a first movement in the practice of the present invention.
Figure 9:
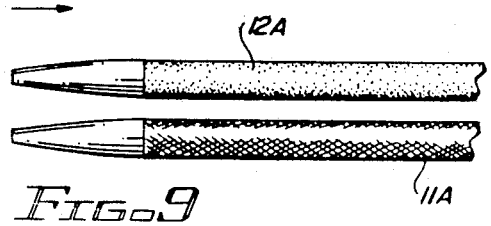
FIG. 9 is an isometric view, partially fragmented, of end segments embodying the present invention when discernably different textured fabrics are used therefor.

While the student is gripping end segments 11, 12, he/she is requested to wrap one segment, for example, segment 12, first over and then under the other segment, for example, segment 11 as shown in FIG. 2. This instruction is given by identifying the dissimilar characteristics of end segments 11 and 12 such for example as by asking the student to take the "birght red" portion and pass it first over then under the "bright yellow" portion, as when distinct and contrasting colors are used; or by telling the student to take the segment which feels smooth (as with velvet, silk, or the like as shown at 12A in FIG. 9) and pass it over and then under the segment which feels rough (as with corduroy, tweed or the like as shown at 11A in FIG. 9) when distinctively feeling materials are used. The step creates the half-knot 14 shown in FIG. 2.

Figure 3:
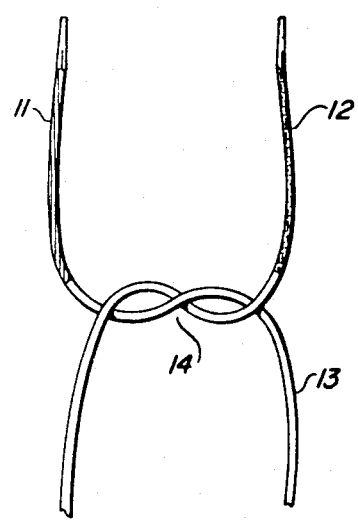
FIG. 3 is an isometric view, partially fragmented, of a second movement in the practice of the present invention.

After wrapping the first end segment 11 about the second end segment 12, and vice versa, in the manner just described to create half-knot 14, the youngster is requested to pull up both end segments 11, 12 until the half-knot 14 is moved down about 4-6 inches from the respective ends thereof as shown in FIG. 3.

Figure 4:
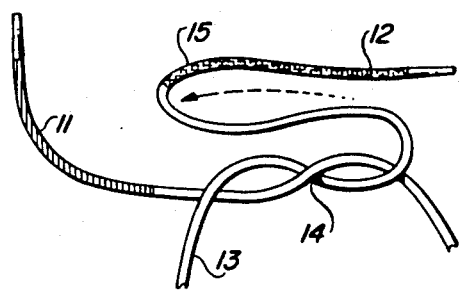
FIG. 4 is an isometric view, partially fragmented, of a third movement in the practice of the present invention.

Next the student is asked to take the bright yellow segment, e.g. 12, and double it back on itself to create a first loop 15 as shown in FIG. 4.

Figure 5:
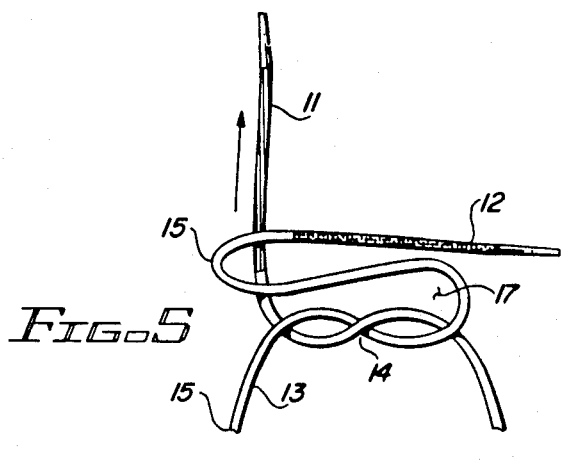
FIG. 5 is an isometric view, partially fragmented, of a fourth movement in the practice of the present invention.
Figure 6:
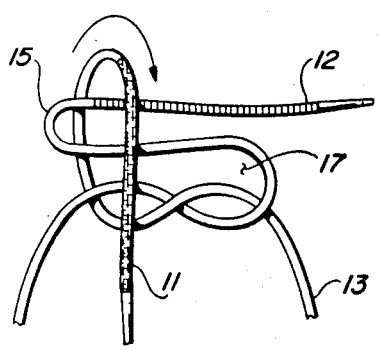
FIG. 6 is an isometric view, partially fragmented, of a fifth movement in the practice of the present invention.

The yellow loop 15 is then laid across the red segment 11 (FIG. 5) and the red segment 11 is folded down over the top of yellow loop 15 as shown in FIG. 6.

Figure 7:
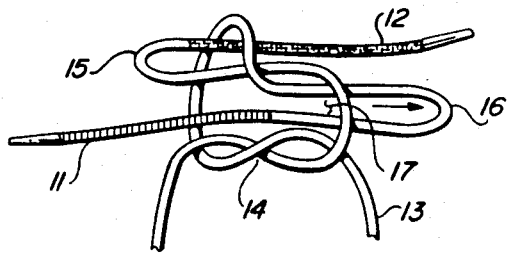
FIG. 7 is an isometric view, partially fragmented, of a sixth movement in the practice of the present invention.

Next, while gripping the yellow loop 15 in one hand just above the half-knot 14 so that loop 15 is spaced away therefrom, the student is requested to "double over" the red segment 11 to form a second loop 16 and to feed that loop 16 into the opening 17 defined by and between loop 15 and half-knot 14, as shown in FIG. 7.

Figure 8:
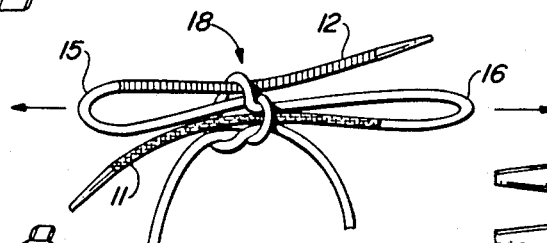
FIG. 8 is an isometric view, partially fragmented, of a final movement in the practice of the present invention.

Finally, the student is requested to grip the end of the yellow (or smooth, etc.) loop 15 between the thumb and forefinger of one hand and the end of the red (or rough, etc.) loop 16 between the thumb and forefinger of the other hand and draw his hands apart thereby enlarging the loops and tightening the wrap around the loops 15, 16 (see FIG. 8) until the loops are snugly secured against half-knot 14 to complete the bow-knot 18.

It is of course understood that where red and yellow appear, any contrasting pair of colored or fabric surfaces can be used within the concept of this invention for the essence is to enable the child to identify which segment to manipulate in response to the given instruction.

From the foregoing it is readily apparent that a learning device and method of using the same has been herein described and illustrated which fulfills all of the aforesaid objectives in a remarkably unexpected fashion. It is, of course, understood that such modifications, alterations and adaptations, as may readily occur to the artisan skilled in the field to which this invention pertains when confronted with this specification, are intended within the spirit of the present invention which is limited only by the scope of the claims appended hereto.

Accordingly what is claimed is:

1. A teaching device for a pre-school and kindergarten aged child comprising a thin elongated body portion, said body having a first end segment, a second end segment and an intermediate segment integrally interposed between said first and said second end segment, said first and said second end segments being readily discernable by feel one from the other to enable said child to rapidly perceive which segment to manipulate in response to directions therefore and create a bow knot therewith, said first end segment being formed from a smooth-feeling fabric and said second end segment being formed from a rough-feeling fabric.

2. A method for training a pre-school or kindergarten aged child in the skill of tying bow knots with a device having a thin elongated body portion, said body having a first end segment, a second end segment and an intermediate segment integrally interposed between said first and said second end segment, said first and said second end segments being readily discernable by feel one from the other to enable said child to rapidly perceive which segment to manipulate in response to directions therefore and create a bow knot therewith said method comprising: crossing said first end segment and said second end segment and wrapping said second end segment once around said first end segment to create a half-knot; drawing said second end segment into a first loop above said half-knot; drawing said first end segment around said first loop and said half-knot to create an opening therebetween; doubling said first end segment into a second loop and passing the closed end of said second loop through said opening; and pulling upon said first and said second loops to tighten said loops against said half-knot and create a tightly formed bow-knot therewith.

3. A method for training a pre-school or kindergarten aged child in the skill of tying bow knots with a device having a thin elongated body portion, said body having a first end segment, a second end segment and an intermediate segment integrally interposed between said first and said second end segment, said first and said second end segments being readily discernable by feel one from the other to enable said child to rapidly perceive which segment to manipulate in response to directions therefore and create a bow knot therewith said first end segment being formed of a smooth-feeling fabric and said second end segment being formed of a rough-feeling fabric; said method comprising: crossing said first end segment and said second end segment and wrapping said second end segment once around said first end segment to create a half-knot; drawing said second end segment into a first loop above said half-knot; drawing said first end segment around said first loop and said half-knot to create an opening therebetween; doubling said first end segment into a second loop and passing the closed end of said second loop through said opening; and pulling upon said first and said second loops to tighten said loops against said half-knot and create a tightly formed bow-knot therewith.

* * * * *